United States Patent
Rao

(10) Patent No.: US 10,728,425 B2
(45) Date of Patent: Jul. 28, 2020

(54) COLOR GAMUT MAPPING METHOD AND COLOR GAMUT MAPPING DEVICE

(71) Applicant: Shenzhen China Star Optoelectronics Semiconductor Display Technology Co., Ltd., Shenzhen (CN)

(72) Inventor: Yang Rao, Hubei (CN)

(73) Assignee: SHENZHEN CHINA STAR OPTOELECTRONICS SEMICONDUCTOR DISPLAY TECHNOLOGY CO., LTD., Shenzhen (CN)

(*) Notice: Subject to any disclaimer, the term of this patent is extended or adjusted under 35 U.S.C. 154(b) by 314 days.

(21) Appl. No.: 15/735,866

(22) PCT Filed: Oct. 20, 2017

(86) PCT No.: PCT/CN2017/107124
§ 371 (c)(1),
(2) Date: Dec. 12, 2017

(87) PCT Pub. No.: WO2019/056445
PCT Pub. Date: Mar. 28, 2019

(65) Prior Publication Data
US 2020/0036867 A1    Jan. 30, 2020

(30) Foreign Application Priority Data
Sep. 21, 2017 (CN) .......................... 2017 1 0863261

(51) Int. Cl.
*H04N 1/60* (2006.01)
*G06T 7/90* (2017.01)

(52) U.S. Cl.
CPC .............. *H04N 1/6061* (2013.01); *G06T 7/90* (2017.01); *H04N 1/6075* (2013.01)

(58) Field of Classification Search
CPC ................................. H04N 1/6061; G06T 7/90
See application file for complete search history.

(56) References Cited

U.S. PATENT DOCUMENTS

2010/0232693 A1* 9/2010 Stevens ................... G06T 5/009
382/167

FOREIGN PATENT DOCUMENTS

| CN | 102209179 A | 10/2011 |
|---|---|---|
| CN | 104112081 A | 10/2014 |

(Continued)

*Primary Examiner* — Tuan H Nguyen
(74) *Attorney, Agent, or Firm* — Hemisphere Law, PLLC; Zhigang Ma

(57) ABSTRACT

A color gamut mapping method and a color gamut mapping device is provided, the method includes: determining a mapping target color gamut; obtaining a Lab value of a color point in the original color gamut, and determining a coordinate position of the color point in a corresponding tone plane of the original color gamut; judging the color point position; determining an intersection of a horizontal line the color point located and a boundary of the original color gamut, and a boundary of the mapping target color gamut; and determining a mapping point of the color point on the boundary of the map target color gamut by a ratio of an area of a pattern formed by the intersection, and an intersection of the original color gamut and a coordinate axis, and a difference between the area of the original color gamut and the area of the mapping target color gamut.

20 Claims, 4 Drawing Sheets

(56) References Cited

FOREIGN PATENT DOCUMENTS

JP      2008271131 A   11/2008
KR   1020050068595 A   7/2005

* cited by examiner

COLOR GAMUT MAPPING METHOD AND COLOR GAMUT MAPPING DEVICE

RELATED APPLICATIONS

The present application is a National Phase of International Application Number PCT/CN2017/107124, filed Oct. 20, 2017, and claims the priority of China Application No. CN 201710863261.X. filed Sep. 21, 2017.

FIELD OF THE DISCLOSURE

The disclosure relates to an image processing field, and more particularly to a color gamut mapping method and a color gamut mapping device.

BACKGROUND

With the continuous development of science and technology, multimedia equipment gradually shows a diversified trend. Different display devices have different color display ways, but the color gamut mapping and matching problems between the display devices are increasingly prominent.

As shown in FIG. 1, the HPMINDE algorithm commonly used at this stage, for the hypo-color field problem, the colors outside the color gamut are all cut to the boundary of the target color gamut, the colors within the color gamut is directly outputted as itis. As shown in FIG. 2, the color within the color gamut is outputted as it is, to ensure the accurate presenting of the color within the color gamut; the point outside the color gamut is mapped in the point direction toward the luminance axis, the color outside the region is mapped in the boundary of the color gamut successively, the area of the color gamut and the mapping line exit a bigger difference, and directly leads to poor mapping uniformity.

For the color gamut mapping algorithm, especially in the process of larger color gamut mapping to the small color gamut, in common algorithm, for the color point located outside the small color gamut is mapping to some point along and toward the direction of the luminance axis, such as small area color gamut of ABHG projecting to the target area for AB, and a large area color gamut of EFJI projecting to the target area for EF, and EF is significantly shorter than AB, resulting in the problems of insufficient uniformity of the mapping, insufficient of the level of detail of the color, and so on.

SUMMARY

The technical problem solved by the invention is to provide a color gamut mapping algorithm, to obtain the coordinates of the mapping points by the proportion of the area, determine the mapping direction, and improve the uniformity and the level of detail of the color points on the boundary.

In order to solve the above technical problem, the present invention provides a color gamut mapping method including the steps of:

Determining a mapping target color gamut of an original color gamut in the same color gamut space; wherein an area of the mapping target color gamut is smaller than an area of the original color gamut:

Obtaining a Lab value of a color point in the original color gamut, and determining a coordinate position of the color point in a corresponding tone plane of the original color gamut according to the Lab value;

Judging whether the color point located outside a mapping target area or not according to the coordinate position;

If the color point located outside the mapping target area, determining an intersection of a horizontal line where the color point located and a boundary of the original color gamut, and a boundary of the mapping target color gamut:

Determining a mapping point of the color point on the boundary of the map target color gamut by a ratio of an area of a pattern formed by the intersection, and an intersection of the original color gamut and a coordinate axis, and a difference between the area of the original color gamut and the area of the mapping target color gamut;

Determining a correspondence point located on the coordinate axis of the pattern formed by the intersection and the intersection of the original color gamut and the coordinate axis according to the ratio, determining an intersection of the connection between the correspondence point and the color point and a boundary of the target mapping target color gamut as a mapping point of the color point on the boundary of the mapping target color gamut;

Obtaining a mapping point distribution of each line segment of the boundary of the mapping target color gamut, according to the mapping point on the boundary of the map target color gamut:

Adjusting a color point mapping direction outside the mapping target area, according to the mapping point distribution of each line segment of the boundary of the mapping target color gamut, making a number of the mapping points on an unit length of the boundary of the mapping target color gamut the same; and Re-converting and outputting the Lab value of the color point with the adjusted mapping direction to a RGB gray scale value.

In order to solve the above technical problem, the present invention provides another color gamut mapping method including the steps of:

Determining a mapping target color gamut of an original color gamut in the same color gamut space; wherein an area of the mapping target color gamut is smaller than an area of the original color gamut:

Obtaining a Lab value of a color point in the original color gamut, and determining a coordinate position of the color point in a corresponding tone plane of the original color gamut according to the Lab value;

Judging whether the color point located outside a mapping target area or not according to the coordinate position;

If the color point located outside the mapping target area, determining an intersection of a horizontal line where the color point located and a boundary of the original color gamut, and a boundary of the mapping target color gamut; and Determining a mapping point of the color point on the boundary of the map target color gamut by a ratio of an area of a pattern formed by the intersection, and an intersection of the original color gamut and a coordinate axis, and a difference between the area of the original color gamut and the area of the mapping target color gamut.

In order to solve the above technical problem, the present invention provides a color gamut mapping device, the color gamut mapping device includes a controller and a data collector electrically connected to each other;

The controller for determining a mapping target color gamut of an original color gamut in the same color gamut space, wherein, an area of the mapping target color gamut is smaller than an area of the original color gamut;

The data collector for obtaining a Lab value of the color point in the original color gamut, and determining a coordinate position of the color point in a corresponding tone plane of the original color gamut according to the Lab value; and The controller further for judging whether the color point located outside a mapping target area or not according to the coordinate position; if the color point located outside the mapping target area, determining an intersection of a horizontal line where the color point located and a boundary of the original color gamut, and a boundary of the mapping target color gamut; determining a mapping point of the color point on the boundary of the map target color gamut by a ratio of an area of a pattern formed by the intersection, and an intersection of the original color gamut and a coordinate axis, and a difference between the area of the original color gamut and the area of the mapping target color gamut.

The advantages of the present invention, comparing to the conventional technology, the present application by determining the mapping target color gamut of the original color gamut in the same color gamut space; obtaining the Lab value of the color point in the original color gamut, and determining the coordinate position of the color point in the corresponding tone plane of the original color gamut according to the Lab value and judging the color point mapping target area according to the coordinate position; if the color point is located outside the mapping target area, determining the intersection of the horizontal line where the color point is located and the boundary of the original color gamut and the boundary of the mapping target color gamut; determining the mapping point of the color point on the boundary of the map target color gamut by the area formed by the intersection, and the intersection of the original color gamut and the coordinate axis and the ratio of the area between the original color gamut and the mapping target color gamut. By the above way, the uniformity of the color points on the boundary is improved, and the color detail level is improved.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the FIGs.

DETAILED DESCRIPTION OF PREFERRED EMBODIMENTS

The disclosure will be further described in detail with reference to accompanying drawings and preferred embodiments as follows.

Figure 1:
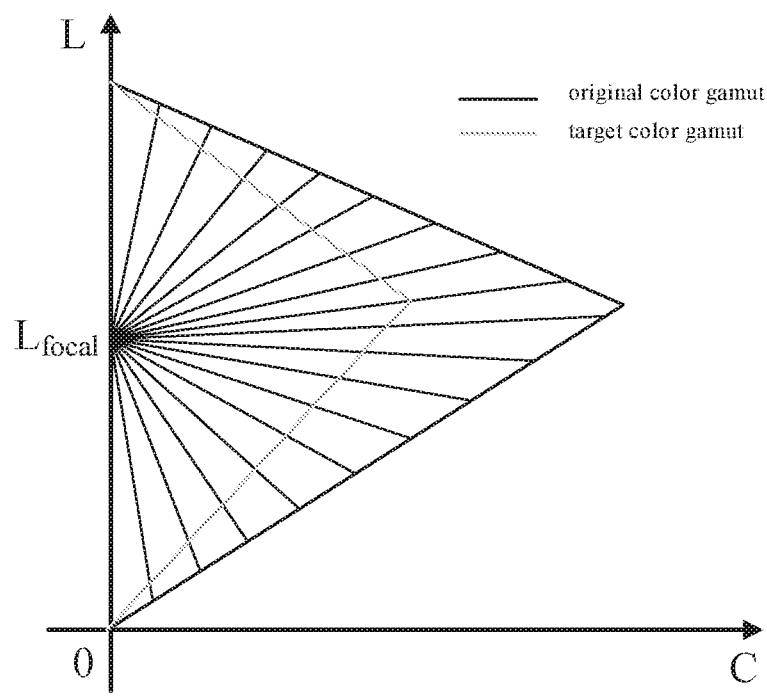
FIG. 1 is a schematic diagram of a cutting target color gamut boundary of a color outside the color gamut by the HPMINDE algorithm of the conventional technology.
Figure 2:
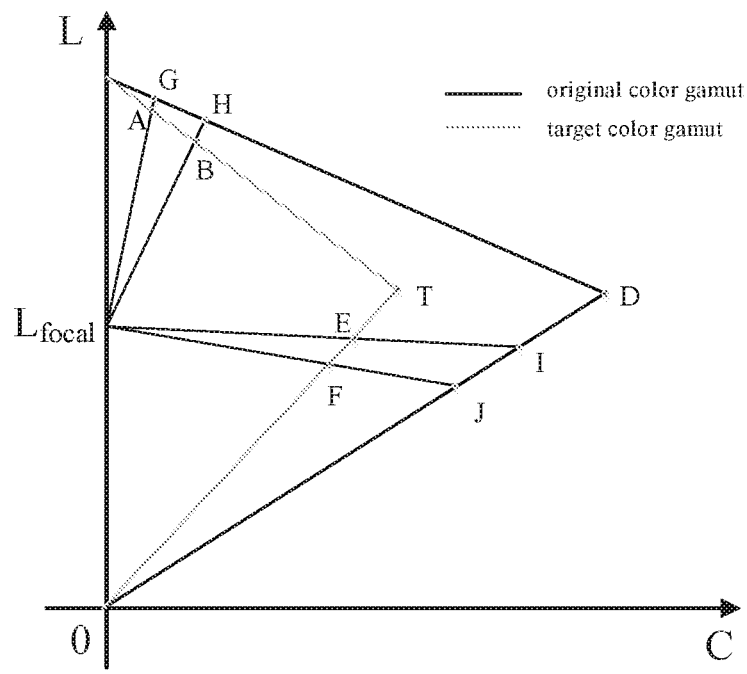
FIG. 2 is a schematic diagram of a mapping in the corresponding boundary of a region outside the color gamut by the HPMINDE algorithm of the conventional technology.
Figure 3:
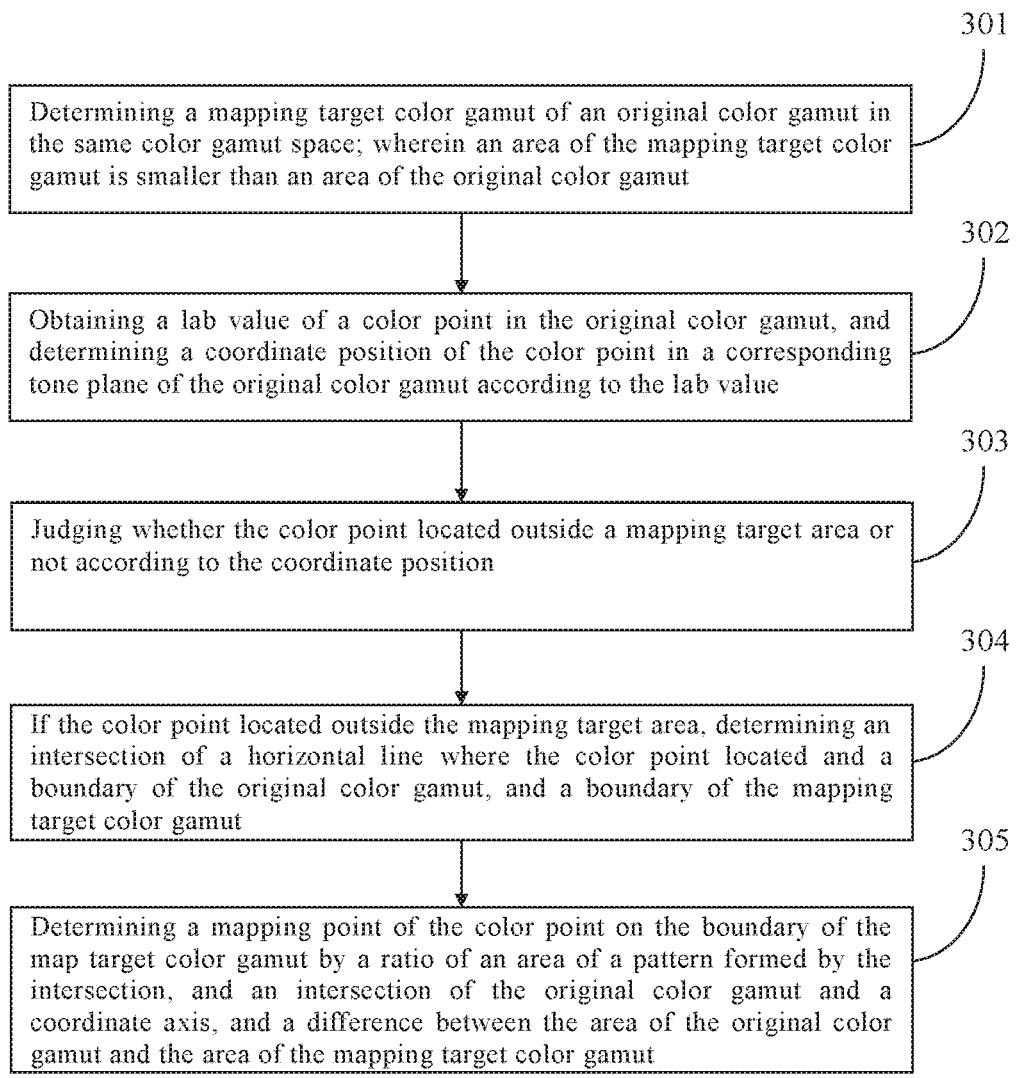
FIG. 3 is a flow chart showing a color gamut mapping method of an embodiment of the present invention.

Referring to FIG. 3. FIG. 3 is a flow chart showing a color gamut mapping method of an embodiment of the present invention; the color gamut mapping method of the present embodiment includes the steps of:

301: determining a mapping target color gamut of the original color gamut in the same color gamut space; wherein the area of the mapping target color gamut is smaller than the area of the original color gamut.

Alternatively, the original color gamut and the mapping target color gamut include a computer graphics color gamut space, a CIE color gamut space, and a TV system color gamut space, for example the original color gamut is the sRGB color gamut, the mapping target color gamut is the Lab color gamut, in other embodiments, it can be the other two different color gamut mapping to each other, and are not limited herein.

Specifically, the original color gamut and the mapping target color gamut confirm all the color spaces, and place the color gamut space in the same coordinate system.

302: obtaining the Lab value of the color point in the original color gamut, and determining the coordinate position of the color point in the corresponding tone plane of the original color gamut according to the Lab value.

Specifically, first, the RGB gray scale value of the color point in the original color gamut is obtained, and the Lab value of the color point in the original color gamut is obtained according to the RGB gray scale value; by using the Lab value of the color point in the original color gamut, the color point in the original color gamut and the luminance axis are plotted, to obtain the chroma value and the hue of the color point in the tone plane corresponding to the original color gamut; determining the coordinate position of the color point in the tone plane corresponding to the original color gamut according to the chroma value and the hue.

Figure 4:
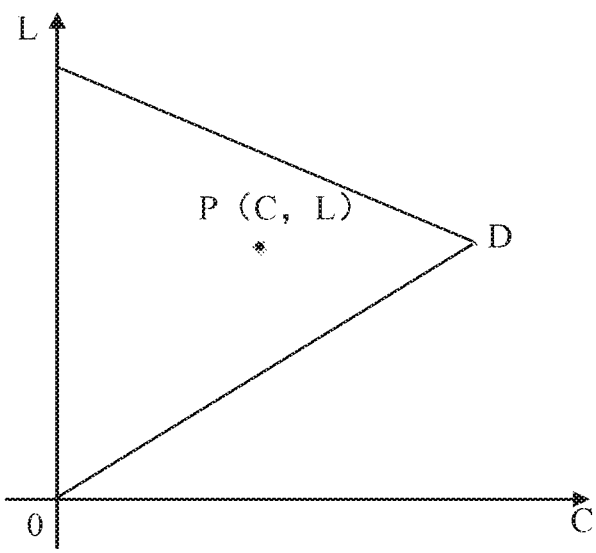
FIG. 4 is a schematic calculation diagram of a chroma value of the color point of an embodiment of the color gamut mapping method shown in FIG. 3.

In order to clearly illustrate the above process, in a specific embodiment, as shown in FIG. 4, FIG. 4 is a schematic calculation diagram of a chroma value of the color point of an embodiment of the color gamut mapping method shown in FIG. 3; in FIG. 4, the horizontal axis is the chroma value, the vertical axis is the luminance. In this coordinate system, by using the Lab value of the color point in the original color gamut, that is the luminance value L, the color value of red/green a and the color value of yellow/blue b, using any point P (C*, L*) and the luminance axis for the plane, the original color gamut three-dimensional space is transferred into a two-dimensional plane, by the color value of red/green a and the color value of yellow/blue b, to determine the hue H* and the chroma value (C*, L*) of the current P point, specifically, as the following equations 1 to 3.

$$H^* = \arctan\frac{b}{a} \quad (1)$$

$$C^* = \sqrt{a^2 + b^2} \quad (2)$$

$$L^* = L \quad (3)$$

Wherein, in order to obtain the Lab value of the color point in the original color gamut, after obtaining the RGB gray scale value of the color point in the original color gamut, the RGB gray scale value of the color point in the original color gamut is converted into the RGB optical value of the color point in the original color gamut by the conversion equation; and converting the RGB optical value of the color point in the original color gamut into the three stimulus value of the color point in the original color gamut; and finally converting the three stimulus values of the color points in the original color gamut into the Lab value of the color points in the original color gamut.

Preferably, the RGB gray scale value of the color point in the original color gamut is converted into the optical value of the color point in the original color gamut by Gamma2.2.

Wherein, Gamma2.2 is a special tone curve, when the Gamma value is equal to 1, the curve is a straight line and 45° with the coordinate axis, this time means that the input and output density is the same, the Gamma2.2 higher than 1 will make the output brightened.

Preferably, the RGB optical values of the color points in the original color gamut are converted to the three stimulus values of the color points in the original color gamut by the conversion matrix.

Under normal circumstances, the RGB gray scale value cannot be directly converted to the Lab value, it need to be first converted to the XYZ three stimulus value and then converted to the Lab value (that is: RGB gray scale value-XYZ tristimulus values-Lab value), in an alternatively embodiment, the RGB gray scale value is first converted to the XYZ tristimulus values.

Specifically, assuming that r, g, b for the three channels of pixels, the range of values are [0,255], the conversion formula is as follows:

$$\begin{cases} R = \text{gamma}\left(\frac{r}{255.0}\right) \\ G = \text{gamma}\left(\frac{r}{255.0}\right) \\ B = \text{gamma}\left(\frac{r}{255.0}\right) \end{cases} \quad (4)$$

$$\text{gamma}(x) = \begin{cases} \left(\frac{x+0.055}{1.055}\right)^{2.4} & (X > 0.04045) \\ \frac{X}{12.92} & \text{others} \end{cases} \quad (5)$$

$$\begin{bmatrix} X \\ Y \\ Z \end{bmatrix} = M \times \begin{bmatrix} R \\ G \\ B \end{bmatrix} \quad (6)$$

Where the conversion matrix is as follows:

$$M = \begin{bmatrix} 0.4124 & 0.3576 & 0.1805 \\ 0.2126 & 0.7152 & 0.0722 \\ 0.0193 & 0.1192 & 0.9505 \end{bmatrix}$$

Equivalent to the following formula:

$X = \text{Var}\_R \times 0.4124 + \text{Var}\_G \times 0.3576 + \text{Var}\_B \times 0.1805$ $X = \text{Var}\_R \times 0.2126 + \text{Var}\_G \times 0.7451 + \text{Var}\_B \times 0.0722$ $X = \text{Var}\_R \times 0.0193 + \text{Var}\_G \times 0.1192 + \text{Var}\_B \times 0.9505$ After obtaining the stimulus value of red primary color X, the stimulus value of green primary color Y, and the stimulus value of blue primary color Z, are converting into the Lab values.

$$L^* = 116 f\left(\frac{Y}{Yn}\right) - 16 \quad (7)$$

$$a^* = 500\left[f\left(\frac{X}{Xn}\right) - f\left(\frac{Y}{Yn}\right)\right]$$

$$b^* = 200\left[f\left(\frac{Y}{Yn}\right) - f\left(\frac{Z}{Zn}\right)\right]$$

$$f(t) = \begin{cases} t^{\frac{1}{3}} & t > \left(\frac{6}{29}\right)^3 \\ \frac{1}{3}\left(\frac{29}{6}\right)^2 t + \frac{4}{29} & \text{others} \end{cases} \quad (8)$$

Wherein X is the stimulus value of red primary color, Y is the stimulus value of green primary color, Z is the stimulus value of blue primary color, default values are adapted for Xn, Yn, Zn as 95.047, 100.0, 108.883, respectively, f(t) is for the correction function, t is the correction parameter, L* is for the luminance value, a* is for the color value of red/green, b* is for the color value of yellow/blue.

303: judging whether the color point is located outside the mapping target area or not according to the coordinate position.

In an alternative embodiment, the coordinate position is compared with the boundary function of the mapping target color gamut, to judge whether the color point is located outside the mapping target area or not.

Specifically, after obtaining the Lab value of the color point in the original color gamut, the luminance value L, the color value of red/green a and the color value of yellow/blue b are obtained, the hue H of the two-dimensional plane and the chroma value (C, L) of the two-dimensional plane is obtained according to the above formulas (1~3), putting the resulting values of the hue and the chroma value into the boundary function of the mapping target color gamut to determine the color point position relationship.

304: If the color point is located outside the mapping target area, determine the intersection of the horizontal line where the color point is located and the boundary of the original color gamut, and the boundary of the mapping target color gamut.

Figure 5:
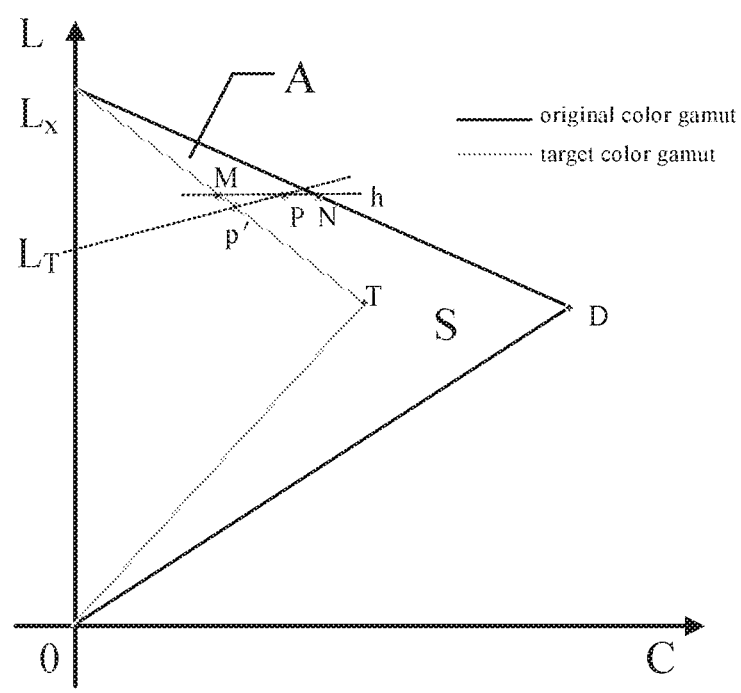
FIG. 5 is a schematic diagram of a corresponding mapping pattern of an embodiment of the color gamut mapping method shown in FIG. 3.

Specifically, as shown in FIG. 5, FIG. 5 is a schematic diagram of a corresponding mapping pattern of an embodiment of the color gamut mapping method shown in FIG. 3; the point P in the FIG. is used as the horizontal line h, the horizontal line h intersects the boundary of the original color gamut at point N, and intersects the boundary of the mapping target color gamut at point M.

Wherein, the Lab value of the color point is directly converted into an RGB gray scale value and outputted, if the color point is located in the mapping target area.

305: determining the mapping point of the color point on the boundary of the map target color gamut by the area formed by the intersection, and the intersection of the original color gamut and the coordinate axis and the ratio of the area between the original color gamut and the mapping target color gamut.

In an alternative embodiment, the pattern formed by the intersection and the intersection of the original color gamut and the coordinate axis located in the correspondence point of the coordinate axis is determined according to the ratio; the intersection of the connection between the correspondence point and the color point and the boundary of the target mapping target color gamut is determined as the mapping point of the color point on the boundary of the mapping target color gamut. The ratio of the difference between the correspondence point and the vertical coordinate distance of the mapping target color gamut and the vertical coordinates of the mapping target color gamut is equal to the above ratio.

Specifically, as shown in FIG. 5, it is assumed that the difference area between the original color gamut and the mapping target color gamut is S, and S=SΔ(L$_x$DO)−SΔ(L$_x$TO) is obtained; having a horizontal line h passes a color point P outside the target color gamut, the horizontal line intersects the two boundaries at M, N points, the area forms by the MN line and the boundaries of the color gamut is A, that is A=SΔ(L$_x$MN); having a line passes p line, the line intersects the vertical axis at the point L$_T$, and intersects the mapping target color gamut boundary at point p', to let A/S=L$_x$L$_T$/L$_x$O, get the L$_T$ coordinate value combined with the color point P coordinate value to confirm the line segment L$_T$P function, substituting the above results into the mapping target gamut boundary function results in the mapping point p'.

Further, obtaining a mapping point distribution of each line segment of the boundary of the mapping target color gamut, according to the mapping point on the boundary of the map target color gamut; and adjusting the color point mapping direction outside the mapping target area, according to the mapping point distribution of each line segment of the boundary of the mapping target color gamut, making the number of mapping points in the unit length of the boundary of the mapping target color gamut is the same, under normal circumstances, it is acceptable to ensure that the number of mapping points in the unit length of the boundary of the mapping target color gamut is within a up and down range of 10%, and then re-converting the Lab value of the color point with the adjusted mapping direction to the RGB gray scale value and outputting.

Figure 6:
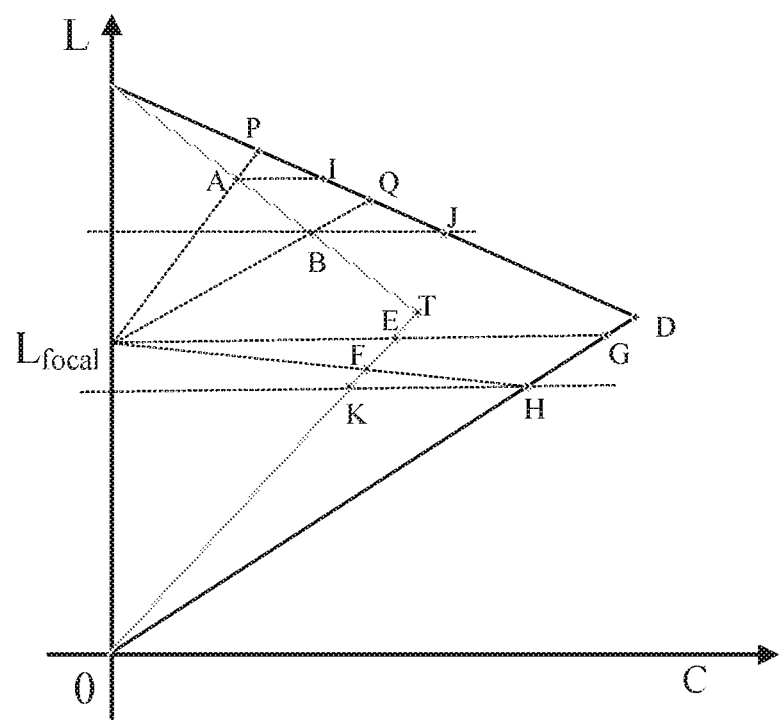
FIG. 6 is a schematic diagram of a corresponding mapping pattern of another embodiment of the color gamut mapping method shown in FIG. 3.

Specifically, as shown in FIG. 6, FIG. 6 is a schematic diagram of a corresponding mapping pattern of another embodiment of the color gamut mapping method shown in FIG. 3. The distribution of the mapping points of the respective color points in the original color gamut on the boundary of the mapping target color gamut is obtained by the above-mentioned method, and the uniformity of the mapping is represented by the number of mapping points per unit length, i.e., β=area S/length L. If the number of mapping points of the mapping line segment is small, as the color area corresponding to the line segment AB, the original area ABQP is increased to the area ABJI, that is, adjusting the mapping direction of the color point, and the connecting direction of the color points within the area ABJI and the corresponding mapping point are fixed in the line segment AB; If the number of mapping points of the mapping line segment is large, as the color area corresponding to the line segment EF, the original mapping corresponding line segment EF is increased to line segment EK, that is adjusting the connecting direction of the color points within the area EFHG and the corresponding mapping point, so that the direction is fixed within the line segment EK, that is, the original area EFHG is performed mapping to the line segment EK direction. The Lab value of the color point after adjusting the mapping direction is converted into the tristimulus value, the specific formulas are as followed 9-10, and then the tristimulus value is converted into the RGB optical value through the conversion matrix, and finally converted into RGB gray scale value by Gamma2.2 Value and outputting.

$$\begin{cases} f\left(\frac{Y}{Yn}\right) = \frac{L+16}{116} \\ f\left(\frac{X}{Xn}\right) = \frac{a}{500} + f\left(\frac{Y}{Yn}\right) \\ f\left(\frac{Z}{Zn}\right) = f\left(\frac{Y}{Yn}\right) - \frac{b}{200} \end{cases} \quad (9)$$

$$t = \begin{cases} f(t)^3 & f(t) > \frac{6}{29} \\ \dfrac{\left(f(t) - \frac{4}{29}\right)}{\left(\frac{29}{6}\right)^2 \times \frac{1}{3}} & \text{others} \end{cases} \quad (10)$$

Wherein, Xn, Yn, Zn using the default values are 95.047, 100.0, 108.883, respectively, L is for the luminance value, a is for the color value of red/green, b is for the color value of yellow/blue, t is for the correction parameters, f(t) is for the correction function.

In a specific embodiment, in inputting the sRGB color gamut space, the RGB gray scale values is converted to the Lab value by the sequentially calculations of the RGB gray scale value of the respective color points in the sRGB color gamut by the gamma2.2 function and the TM conversion matrix and the conversion equation, the area of each color point located is determined by the Lab value, the mapping direction of each of the color points outside the mapping target area is changed by the simulation calculations (specifically, the above-described embodiments), the Lab value of the color point after adjusting the mapping direction is re-converted to the RGB gray scale value and outputting.

Comparing to the conventional technology, in the present embodiment, by determining the mapping target color gamut of the original color gamut in the same color gamut space; obtaining the Lab value of the color point in the original color gamut, and determining the coordinate position of the color point in the corresponding tone plane of the original color gamut according to the Lab value and judging the color point mapping target area according to the coordinate position; if the color point is located outside the mapping target area, determining the intersection of the horizontal line where the color point is located and the boundary of the original color gamut and the boundary of the mapping target color gamut; determining the mapping point of the color point on the boundary of the map target color gamut by the area formed by the intersection, and the intersection of the original color gamut and the coordinate axis and the ratio of the area between the original color gamut and the mapping target color gamut. By the above way, the uniformity of the color points on the boundary is improved, and the color detail level is improved.

Figure 7:
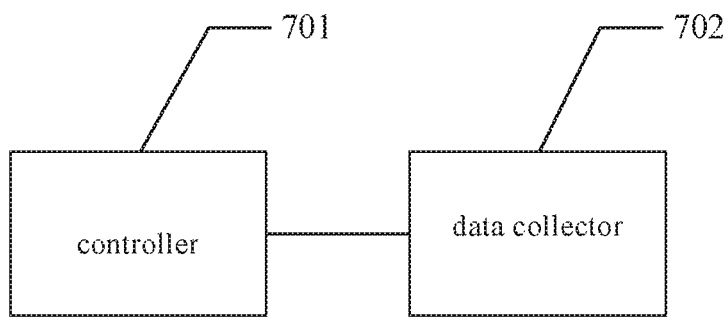
FIG. 7 is a schematic structural view of a color gamut mapping device of an embodiment according to the present invention.

The present invention also provides a color gamut mapping device, referring to FIG. 7, FIG. 7 is a schematic structural view of a color gamut mapping device of an embodiment according to the present invention, including a controller 701 and a data collector 702 electrically connected to each other; the controller 701 is for determining the mapping target color gamut of the original color gamut in the same color gamut space, wherein, the area of the mapping target color gamut is smaller than the area of the original color gamut; the data collector 702 is for obtaining the Lab value of the color point in the original color gamut, and determining the coordinate position of the color point in the corresponding tone plane of the original color gamut according to the Lab value. The controller 702 is further for determining whether the color point is located outside the mapping target area or not according to the coordinate position; if the color point is located outside the mapping target area, determine the intersection of the horizontal line where the color point is located and the boundary of the original color gamut, and the boundary of the mapping target color gamut; determining the mapping point of the color point on the boundary of the map target color gamut by the area formed by the intersection, and the intersection of the original color gamut and the coordinate axis and the ratio of the area between the original color gamut and the mapping target color gamut.

The detail executing process can be referring to FIGS. 3 to 6 and the related descriptions of any of the embodiments, and will not be described here.

Comparing to the conventional technology, in the present embodiment, by determining the mapping target color gamut of the original color gamut in the same color gamut space; obtaining the Lab value of the color point in the original color gamut, and determining the coordinate position of the color point in the corresponding tone plane of the original color gamut according to the Lab value and judging the color point mapping target area according to the coordinate position; if the color point is located outside the mapping target area, determining the intersection of the horizontal line where the color point is located and the boundary of the original color gamut and the boundary of the mapping target color gamut; determining the mapping point of the color point on the boundary of the map target color gamut by the area formed by the intersection, and the intersection of the original color gamut and the coordinate axis and the ratio of the area between the original color gamut and the mapping target color gamut. By the above way, the uniformity of the color points on the boundary is improved, and the color detail level is improved.

Further, the present embodiment further simplifies the calculation process of the color gamut mapping process by the color gamut mapping device, and all the colors outside the color gamut are shift to the target color gamut boundary by the color gamut mapping device, and the mapping directions of the respective color point is optimized, to improve the uniformity of the color points mapping on the boundary and the level of detail and other issues.

The foregoing contents are detailed description of the disclosure in conjunction with specific preferred embodiments and concrete embodiments of the disclosure are not limited to these descriptions. For the person skilled in the art of the disclosure, without departing from the concept of the disclosure, simple deductions or substitutions can be made and should be included in the protection scope of the application.

What is claimed is:

1. A color gamut mapping method, comprising the steps of:
    determining a mapping target color gamut of an original color gamut in the same color gamut space; wherein an area of the mapping target color gamut is smaller than an area of the original color gamut;
    obtaining a Lab value of a color point in the original color gamut, and determining a coordinate position of the color point in a corresponding tone plane of the original color gamut according to the Lab value of the color point;
    judging whether the color point located outside a mapping target area or not according to the coordinate position;
    if the color point located outside the mapping target area, determining an intersection of a horizontal line where the color point located, a boundary of the original color gamut, and a boundary of the mapping target color gamut;
    determining a mapping point of the color point on the boundary of the mapping target color gamut by a ratio of an area of a pattern formed by the intersection of the horizontal line where the color point located, the boundary of the original color gamut, and the boundary of the mapping target color gamut, and an intersection of the original color gamut and a coordinate axis, and a difference between the area of the original color gamut and the area of the mapping target color gamut;
    determining a correspondence point located on the coordinate axis of the pattern formed by the intersection of the horizontal line where the color point located, the boundary of the original color gamut, and the boundary of the mapping target color gamut and the intersection of the original color gamut and the coordinate axis according to the ratio, determining an intersection of a connection between the correspondence point and the color point and the boundary of the mapping target color gamut as the mapping point of the color point on the boundary of the mapping target color gamut;
    obtaining a mapping point distribution of each line segment of the boundary of the mapping target color gamut, according to mapping points on the boundary of the mapping target color gamut;
    adjusting a color point mapping direction outside the mapping target area, according to the mapping point distribution of each line segment of the boundary of the mapping target color gamut, making a number of the mapping points in each unit length of the boundary of the mapping target color gamut the same; and
    re-converting and outputting the Lab value of the color point with the adjusted mapping direction to a RGB gray scale value.

2. The color gamut mapping method according to claim 1, wherein a ratio of a difference between the correspondence point and a vertical coordinate distance of the mapping target color gamut, and the vertical coordinates of the mapping target color gamut is equal to the ratio.

3. The color gamut mapping method according to claim 1, wherein the step of obtaining the Lab value of the color point in the original color gamut, and determining the coordinate position of the color point in the corresponding tone plane of the original color gamut according to the Lab value of the color point specifically comprises:
    obtaining a RGB gray scale value of the color point in the original color gamut, obtaining the Lab value of the color point in the original color gamut according to the RGB gray scale value;
    by using the Lab value of the color point in the original color gamut, plotting a plane by the color point in the original color gamut and a luminance axis, obtaining a chroma value and a hue of the color point in the tone plane corresponding to the original color gamut; and
    determining the coordinate position of the color point in the tone plane corresponding to the original color gamut according to the chroma value and the hue.

4. The color gamut mapping method according to claim 3, wherein the step of obtaining the RGB gray scale value of the color point in the original color gamut, obtaining the Lab value of the color point in the original color gamut according to the RGB gray scale value specifically comprises:
    obtaining the RGB gray scale value of the color point in the original color gamut, converting the RGB gray scale value of the color point in the original color gamut into an RGB optical value of the color point in the original color gamut;

converting the RGB optical value of the color point in the original color gamut into a tristimulus value of the color point in the original color gamut; and converting the three stimulus values of the color points in the original color gamut into the Lab values of the color points in the original color gamut.

5. The color gamut mapping method according to claim 4, wherein the RGB optical value of the color point in the original color gamut is converted into the tristimulus value of the color point within the original color gamut by a conversion matrix.

6. The color gamut mapping method according to claim 1, wherein the step of judging whether the color point located outside the mapping target area or not according to the coordinate position specifically comprises:

comparing the coordinate position with a boundary function of the mapping target color gamut to determine whether the color point is located outside the mapping target area or not.

7. A color gamut mapping method, comprising the steps of:

determining a mapping target color gamut of an original color gamut in the same color gamut space; wherein an area of the mapping target color gamut is smaller than an area of the original color gamut;

obtaining a Lab value of a color point in the original color gamut, and determining a coordinate position of the color point in a corresponding tone plane of the original color gamut according to the Lab value of the color point;

judging whether the color point located outside a mapping target area or not according to the coordinate position;

if the color point located outside the mapping target area, determining an intersection of a horizontal line where the color point located, a boundary of the original color gamut, and a boundary of the mapping target color gamut; and determining a mapping point of the color point on the boundary of the mapping target color gamut by a ratio of an area of a pattern formed by the intersection of the horizontal line where the color point located, the boundary of the original color gamut, and the boundary of the mapping target color gamut, and an intersection of the original color gamut and a coordinate axis, and a difference between the area of the original color gamut and the area of the mapping target color gamut.

8. The color gamut mapping method according to claim 7, wherein the step of determining the mapping point of the color point on the boundary of the mapping target color gamut by the ratio of the area of the pattern formed by the intersection of the horizontal line where the color point located, the boundary of the original color gamut, and the boundary of the mapping target color gamut, and the intersection of the original color gamut and the coordinate axis, and the difference between the area of the original color gamut and the area of the mapping target color gamut specifically comprises:

determining a correspondence point located on the coordinate axis of the pattern formed by the intersection of the horizontal line where the color point located, the boundary of the original color gamut, and the boundary of the mapping target color gamut and the intersection of the original color gamut and the coordinate axis according to the ratio; and determining an intersection of the connection between the correspondence point and the color point and a boundary of the target mapping target color gamut as a mapping point of the color point on the boundary of the mapping target color gamut.

9. The color gamut mapping method according to claim 8, wherein a ratio of a difference between the correspondence point and a vertical coordinate distance of the mapping target color gamut, and the vertical coordinates of the mapping target color gamut is equal to the ratio.

10. The color gamut mapping method according to claim 7, wherein the step of obtaining the Lab value of the color point in the original color gamut, and determining the coordinate position of the color point in the corresponding tone plane of the original color gamut according to the Lab value of the color point specifically comprises:

obtaining a RGB gray scale value of the color point in the original color gamut, obtaining the Lab value of the color point in the original color gamut according to the RGB gray scale value;

by using the Lab value of the color point in the original color gamut, plotting a plane by the color point in the original color gamut and a luminance axis, obtaining a chroma value and a hue of the color point in the tone plane corresponding to the original color gamut; and determining the coordinate position of the color point in the tone plane corresponding to the original color gamut according to the chroma value and the hue.

11. The color gamut mapping method according to claim 10, wherein the step of obtaining the RGB gray scale value of the color point in the original color gamut, obtaining the Lab value of the color point in the original color gamut according to the RGB gray scale value specifically comprises:

obtaining the RGB gray scale value of the color point in the original color gamut, converting the RGB gray scale value of the color point in the original color gamut into an RGB optical value of the color point in the original color gamut;

converting the RGB optical value of the color point in the original color gamut into a tristimulus value of the color point in the original color gamut; and converting the three stimulus values of the color points in the original color gamut into the Lab values of the color points in the original color gamut.

12. The color gamut mapping method according to claim 11, wherein the RGB optical value of the color point in the original color gamut is converted into the tristimulus value of the color point within the original color gamut by a conversion matrix.

13. The color gamut mapping method according to claim 7, wherein the step of judging whether the color point located outside the mapping target area or not according to the coordinate position specifically comprises:

comparing the coordinate position with a boundary function of the mapping target color gamut to determine whether the color point is located outside the mapping target area or not.

14. The color gamut mapping method according to claim 7, wherein after the step of determining the mapping point of the color point on the boundary of the mapping target color gamut by the ratio of the area of the pattern formed by the intersection of the horizontal line where the color point located, the boundary of the original color gamut, and the boundary of the mapping target color gamut, and the intersection of the original color gamut and the coordinate axis, and the difference between the area of the original color gamut and the area of the mapping target color gamut further comprises:

obtaining a mapping point distribution of each line segment of the boundary of the mapping target color gamut, according to mapping points on the boundary of the mapping target color gamut;

adjusting a color point mapping direction outside the mapping target area, according to the mapping point distribution of each line segment of the boundary of the mapping target color gamut, making a number of the mapping points in each unit length of the boundary of the mapping target color gamut the same; and re-converting and outputting the Lab value of the color point with the adjusted mapping direction to a RGB gray scale value.

15. The color gamut mapping method according to claim 7, wherein the step of if the color point located outside the mapping target area, determining an intersection of a horizontal line where the color point located and a boundary of the original color gamut, and a boundary of the mapping target color gamut further comprises:

directly converting and outputting the Lab value of the color point into the RGB gray scale value, if the color point is located within the mapping target area.

16. A color gamut mapping device, comprising:

a controller and a data collector electrically connected to each other;

the controller for determining a mapping target color gamut of an original color gamut in the same color gamut space, wherein, an area of the mapping target color gamut is smaller than an area of the original color gamut;

the data collector for obtaining a Lab value of the color point in the original color gamut, and determining a coordinate position of the color point in a corresponding tone plane of the original color gamut according to the Lab value of the color point; and the controller further for judging whether the color point located outside a mapping target area or not according to the coordinate position; if the color point located outside the mapping target area, determining an intersection of a horizontal line where the color point located, a boundary of the original color gamut, and a boundary of the mapping target color gamut; determining a mapping point of the color point on the boundary of the mapping target color gamut by a ratio of an area of a pattern formed by the intersection of the horizontal line where the color point located, the boundary of the original color gamut, and the boundary of the mapping target color gamut, and an intersection of the original color gamut and a coordinate axis, and a difference between the area of the original color gamut and the area of the mapping target color gamut.

17. The color gamut mapping device according to claim 16, wherein the controller is specifically for determining a correspondence point located on the coordinate axis of the pattern formed by the intersection of the horizontal line where the color point located, the boundary of the original color gamut, and the boundary of the mapping target color gamut and the intersection of the original color gamut and the coordinate axis according to the ratio; and determining an intersection of the connection between the correspondence point and the color point and a boundary of the target mapping target color gamut as a mapping point of the color point on the boundary of the mapping target color gamut.

18. The color gamut mapping device according to claim 16, wherein the data collector is specifically for obtaining a RGB gray scale value of the color point in the original color gamut, obtaining the Lab value of the color point in the original color gamut according to the RGB gray scale value; by using the Lab value of the color point in the original color gamut, plotting a plane by the color point in the original color gamut and a luminance axis, obtaining a chroma value and a hue of the color point in the tone plane corresponding to the original color gamut; and determining the coordinate position of the color point in the tone plane corresponding to the original color gamut according to the chroma value and the hue.

19. The color gamut mapping device according to claim 18, wherein the data collector is specifically for obtaining the RGB gray scale value of the color point in the original color gamut, converting the RGB gray scale value of the color point in the original color gamut into an RGB optical value of the color point in the original color gamut; converting the RGB optical value of the color point in the original color gamut into a tristimulus value of the color point in the original color gamut; and converting the three stimulus values of the color points in the original color gamut into the Lab values of the color points in the original color gamut.

20. The color gamut mapping device according to claim 16, wherein the controller is specifically for obtaining a mapping point distribution of each line segment of the boundary of the mapping target color gamut, according to mapping points on the boundary of the mapping target color gamut; adjusting a color point mapping direction outside the mapping target area, according to the mapping point distribution of each line segment of the boundary of the mapping target color gamut, making a number of the mapping points on an in each unit length of the boundary of the mapping target color gamut the same; and re-converting and outputting the Lab value of the color point with the adjusted mapping direction to a RGB gray scale value.

* * * * *